United States Patent
Wong et al.

(10) Patent No.: US 8,169,925 B2
(45) Date of Patent: May 1, 2012

(54) MAPPING OF PREAMBLE SEQUENCE SETS WITH FRAME CONTROL HEADER (FCH) LOCATION FOR MULTI-HOP WIRELESS BROADBAND ACCESS COMMUNICATIONS

(75) Inventors: Wendy C. Wong, San Jose, CA (US); Jaroslaw J. Sydir, San Jose, CA (US); Hyunjeong Hannah Lee, Hillsboro, OR (US); Kerstin Johnsson, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 745 days.

(21) Appl. No.: 11/923,586

(22) Filed: Oct. 24, 2007

(65) Prior Publication Data
US 2008/0117846 A1 May 22, 2008

Related U.S. Application Data

(60) Provisional application No. 60/854,468, filed on Oct. 25, 2006.

(51) Int. Cl.
*H04L 12/28* (2006.01)
(52) U.S. Cl. ........................................ 370/252; 370/310
(58) Field of Classification Search .................. 370/204, 370/206, 252, 254, 310, 315, 392; 455/7
See application file for complete search history.

(56) References Cited

U.S. PATENT DOCUMENTS

| | | | |
|---|---|---|---|
| 6,587,526 B1 | 7/2003 | Li et al. | |
| 6,674,737 B1 * | 1/2004 | Baker | 370/338 |
| 2006/0045003 A1 * | 3/2006 | Choi et al. | 370/208 |
| 2006/0092875 A1 | 5/2006 | Yang et al. | |
| 2007/0280098 A1 * | 12/2007 | Bhatt et al. | 370/208 |
| 2008/0117856 A1 * | 5/2008 | Wong et al. | 370/315 |
| 2008/0137583 A1 * | 6/2008 | Sydir et al. | 370/315 |

FOREIGN PATENT DOCUMENTS

| | | |
|---|---|---|
| EP | 1195937 A1 | 4/2002 |
| WO | 2006096421 A2 | 9/2006 |
| WO | 2008/051618 A1 | 5/2008 |

OTHER PUBLICATIONS

Hoymann, C., et al. 'Multihop Communication in Relay Enhanced IEEE 802.16 Networks': 2006 IEEE 17th International Symposium IEEE, Sep. 2006; 4 pgs.
International Preliminary Report on Patentability received for PCT Patent Application No. PCT/US2007/022765, mailed on May 7, 2009, 6 pages.
International Search Report and Written Opinion received for PCT Patent Application No. PCT/US2007/022765, mailed on Mar. 5, 2008, 9 pages.

* cited by examiner

*Primary Examiner* — Kevin C Harper
*Assistant Examiner* — Mon Cheri Davenport
(74) *Attorney, Agent, or Firm* — Kacvinsky Daisak, PLLC

(57) ABSTRACT

FCH locations are mapped to preamble sequence sets to allow more than three stations to transmit their FCHs with minimized or reduced interference. A lower interference environment may be provided to transmit the FCH within each DL relay phase when the number of stations within the phase is less than the number (L) of distinct FCH locations. With more than L stations in a DL relay phase, a reduced interference environment for FCH transmission may be achieved by assigning the same FCH location to RSs that are far away from each other.

14 Claims, 4 Drawing Sheets

MAPPING OF PREAMBLE SEQUENCE SETS WITH FRAME CONTROL HEADER (FCH) LOCATION FOR MULTI-HOP WIRELESS BROADBAND ACCESS COMMUNICATIONS

The present application claims priority to U.S. Patent Application No. 60/854,468, filed Oct. 25, 2006, entitled "Mapping of Preamble Sequence Sets with Frame Control Header (Fch) Location for Multi-Hop Wireless Broadband Access Communications," the entire disclosure of which is hereby incorporated by reference in its entirety.

Developments in a number of different digital technologies have greatly increased the need to transfer data from one device across a network to another system. Technological developments permit digitization and compression of large amounts of voice, video, imaging, and data information, which may be transmitted from laptops and other digital equipment to other devices within the network. These developments in digital technology have stimulated a need to deliver and supply data to these processing units.

It is becoming increasingly attractive to use wireless nodes in a wireless network as relaying points to extend range and/or reduce costs of a wireless network. A Multi-hop Relay (MR) network may use fixed and/or mobile stations as relaying points to optimize communications and increase the efficiency of transmissions. One notable issue is how to coordinate the selection of optimal transmission paths using new protocols and architectures and reduce costs associated with these networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
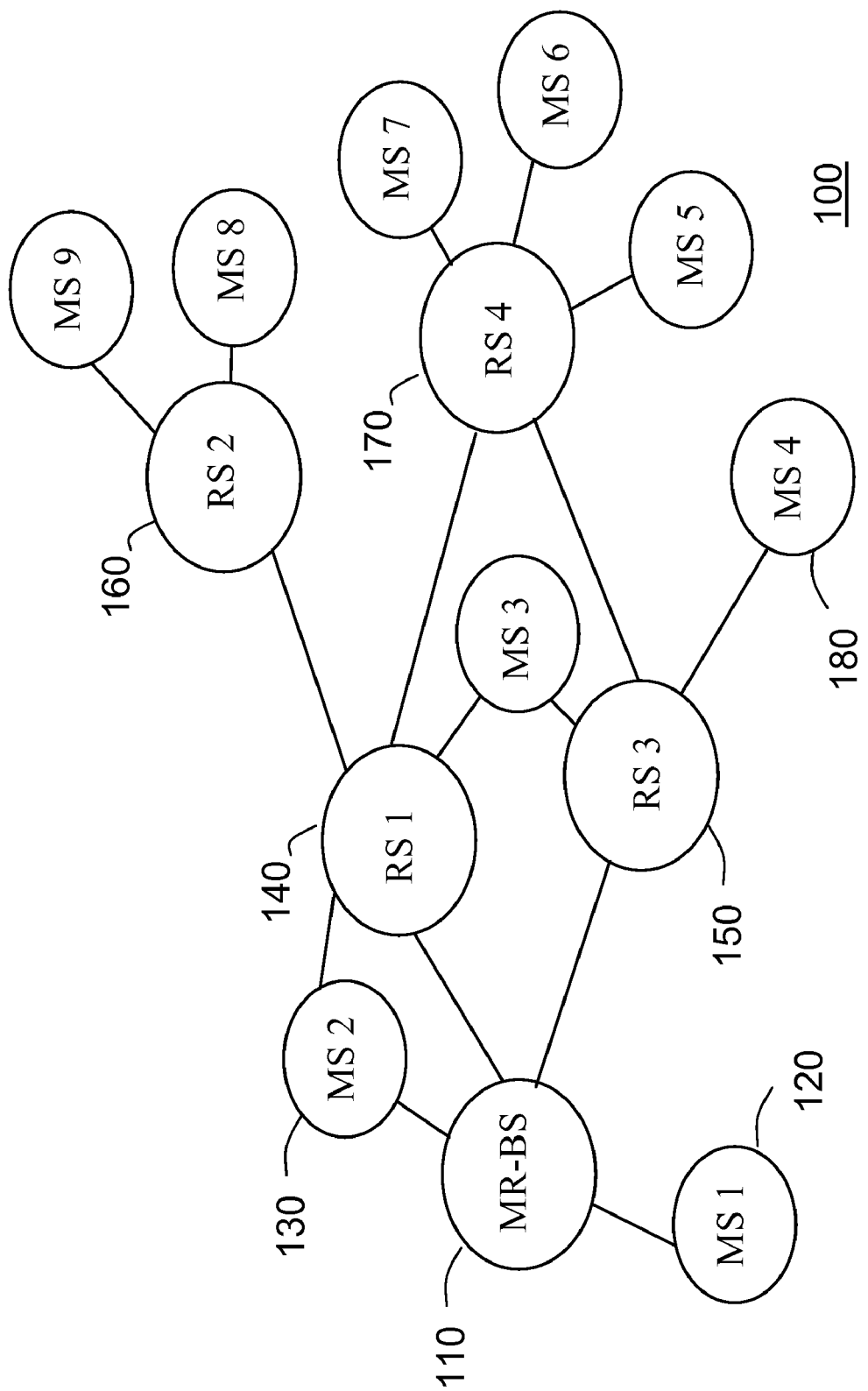
FIG. 1 is a diagram illustrating an arrangement of wireless nodes in an example wireless network for conveying multi-hop link information according to one embodiment of the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Wireless multi-hop relay systems have become the focus of several current standardization efforts. For example, for WLANs the Institute of Electrical and Electronics Engineers (IEEE) 802.11s Mesh Task Group (TG) is actively working on standard solutions for WLAN mesh networking. Additionally, the IEEE 802.16j Multi-hop Relay (MR) task group is also evaluating solutions for standardization in furtherance of the IEEE 802.16j project approval request for wireless broadband access (WBA) networks.

The multi-hop relay systems provide a cost effective way for multi-media traffic to increase in range. The relay stations offer extended coverage through existing networks and the MR system is a cost effective solution accommodating many mobile subscribers, establishing wide area coverage and providing higher data rates. Thus, the multi-hop relay systems enhance throughput and capacity for 802.16 systems and enable rapid deployment which reduces the cost of system operation.

MR relay stations are intended to be fully backward compatible in the sense that they should operate seamlessly with existing 802.16e subscriber stations. A further phase of 802.16 is expected to introduce enhanced relay and WBA subscriber stations designed for use in MR networks. While the embodiments discussed herein may refer to 802.16 wireless broadband access networks, sometimes referred to as WiMAX, an acronym that stands for Worldwide Interoperability for Microwave Access, which is a certification mark for products that pass conformity and interoperability tests for the IEEE 802.16 standards, they are not so limited and may be applicable to WLAN, other types of mesh networks or even combinations of different networks. Multi-hop relay techniques may be applied to other emerging standards such as 3rd Generation Partnership Project (3GPP) for the Long Term Evolution (LTE).

FIG. 1 is a diagram illustrating an arrangement of wireless nodes in an example wireless network for conveying multi-hop link information according to one embodiment of the present invention. A Multi-hop Relay (MR) network 100 may be any system having devices capable of transmitting and/or receiving information via at least some Over-The-Air (OTA) Radio Frequency (RF) links. For example in one embodiment, the topology of MR network 100 may include an MR Base Station (MR-BS) 110 that provides direct access to multiple Mobile Stations (MSs) 120 and 130. MR-Base Station 110 also connects to a plurality of unwired relay nodes shown as Relay Stations (RS) 140 and 150 in the figure.

Relay Stations (RSs) 140 and 150 wirelessly communicate and relay messages in MR network 100 using wireless protocols and/or techniques compatible with one or more of the various 802 wireless standards for WPANs and/or standards for WMANs, although the inventive embodiments are not limited in this respect. As illustrated in the figure, Relay Stations (RSs) 140 and 150 provide access to Mobile Stations 130 and 180 as well as relay data on behalf of other RSs. In certain non-limiting example implementations of the inventive embodiments, the topology illustrated is tree-like with the MR-BS at the root and MSs at the leaves to provide multiple communication paths or links. Access links provide the supported paths between the MR-BS and the MS and further between the RS and the MS. Relay links provide the support paths between the MR-BS and the RSs.

MR network 100 may be comprised of several macro cells, each of which may generally comprise at least one base station similar to MR base station 110 and a plurality of relay stations similar to RSs 140 and 150 dispersed throughout each macro cell and working in combination with the base station(s) to provide a full range of coverage to client stations. The multi-hop topology between MR-BS 110 and RSs 140 and 150 can be viewed as a Point-to-Multipoint (PMP) link. Further, RS 140 is connected to RS 160 and RS 170 via a PMP link, where each PMP link relies on the stations to maintain time and frequency synchronization that is performed via the broadcast and reception of a downlink (DL) preamble, whereas uplink (UL) synchronization is performed by a ranging process.

MR network 100 utilizes a frame structure which allows multiple relay links to share a channel, and thus, multiple PMP links may be supported on the same channel. When multiple PMP links share a channel, the stations that participate in the links synchronize and data is transmitted to minimize interference. The frame structure is configurable to optimize the topology and the requirements for deployment and allow the multiple PMP links to share the channel while utilizing a combination of time division multiplexing (TDM) and spatial reuse.

Figure 2:
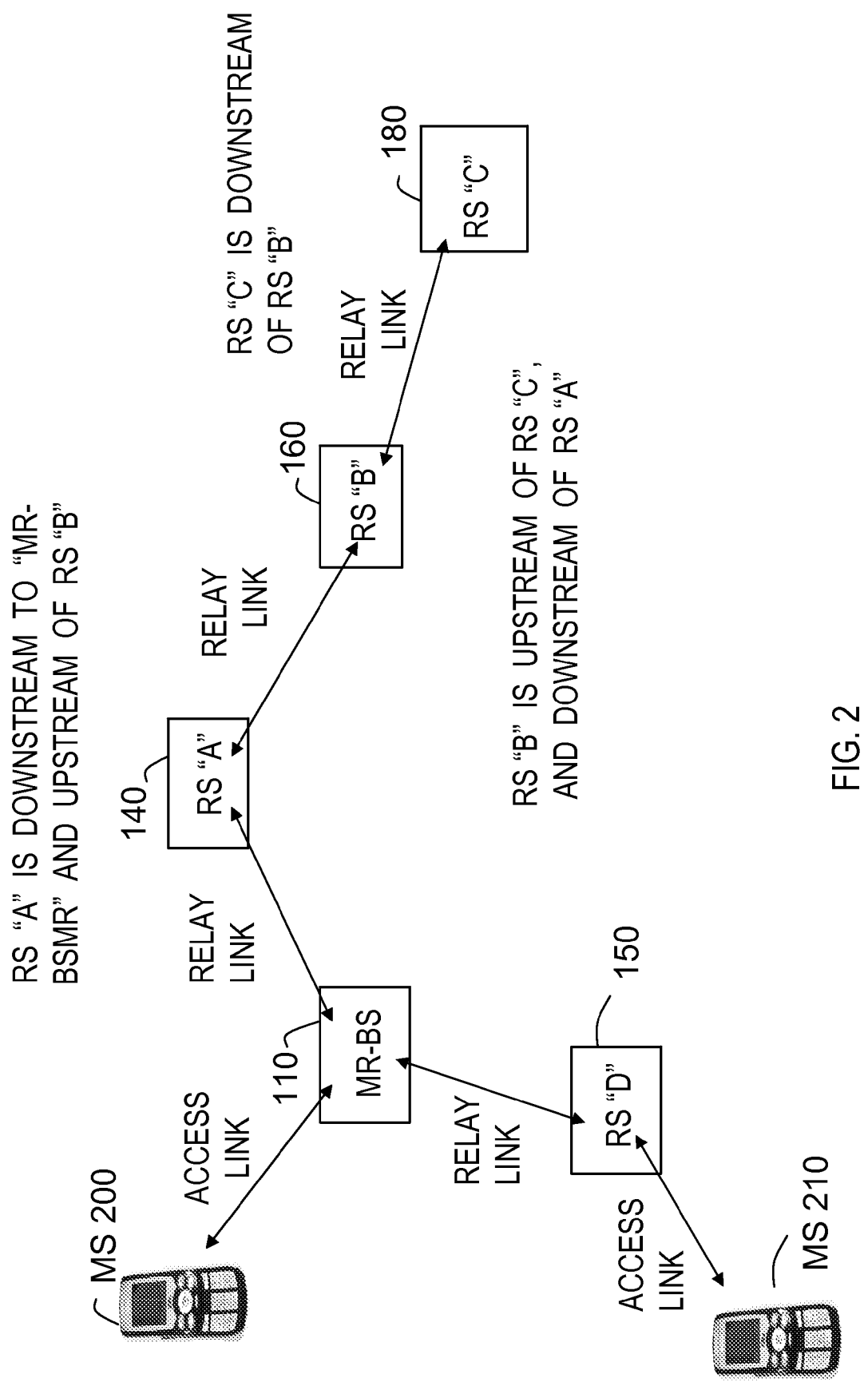
FIG. 2 is an example Multi-hop Relay (MR) network in which a MR-BS is at the root and RSs are at the leaves of a tree-like topology.

FIG. 2 is an example of a Multi-hop Relay (MR) network 100 in which MR-BS 110 is at the root and RS140, RS 160, RS 160 and RS 180 are intermediate nodes in a tree-like topology. Access links support direct communication paths between a MR-BS and MSs such as, for example, the link between MR-BS 110 and mobile station 200 or between an RS and MSs such as, for example, the link between RS 150 and mobile station 210. Relay links support direct communication paths between a MR-BS and RSs such as, for example, the link between MR-BS 110 and Relay Station 140. In the example the figure illustrates that RS 140 is downstream from MR-BS 110 while RS 160 is downstream of RS 140, but upstream to RS 180.

Figure 3:
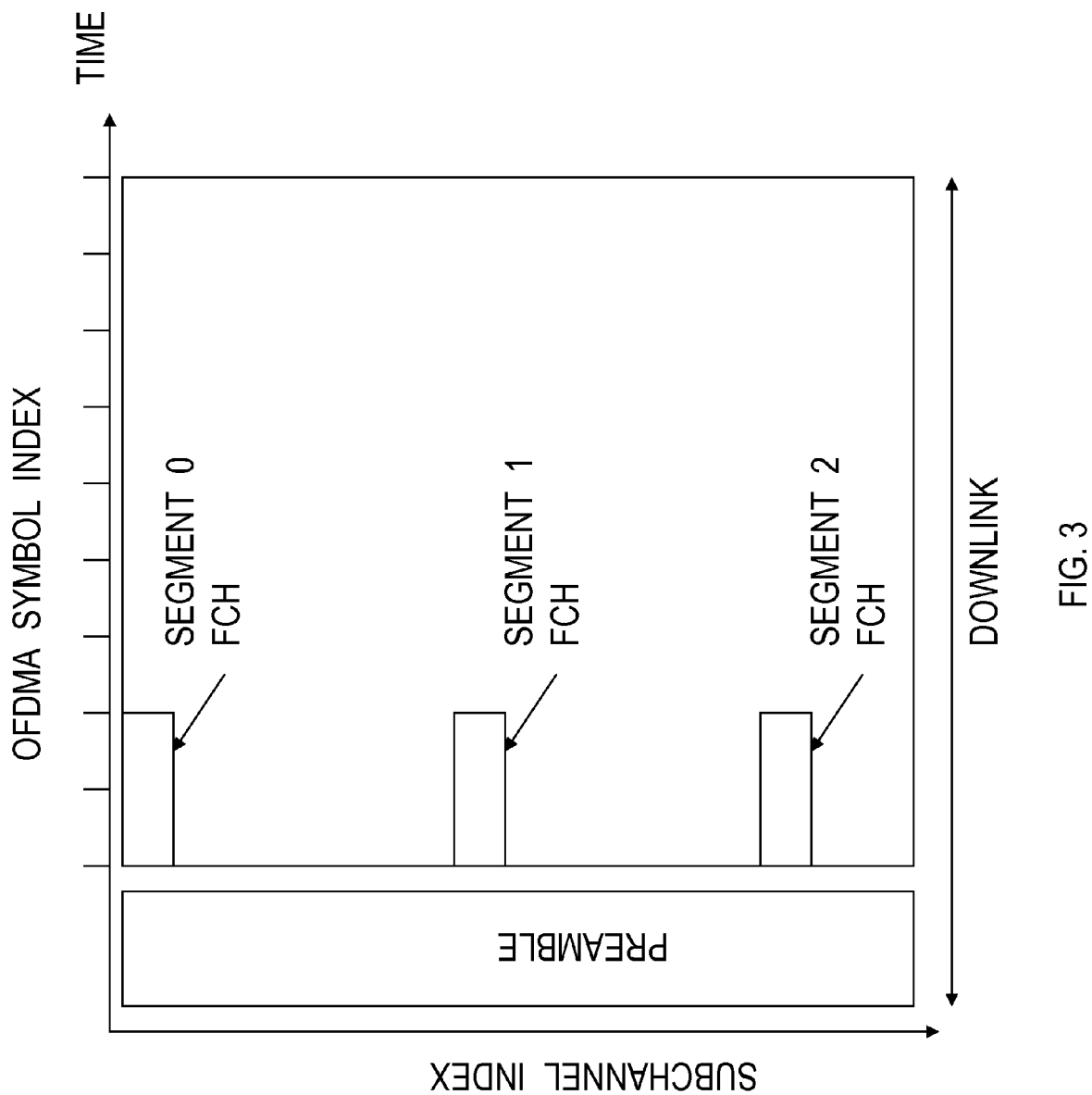
FIG. 3 illustrates a Down Link (DL) relay phase showing a DL preamble followed by a Frame Control Header (FCH)

FIG. 3 illustrates a Down Link (DL) relay phase showing a DL preamble followed by a Frame Control Header (FCH). In the IEEE 802.16/802.16e standards, the FCH follows the preamble at the beginning of each frame. More specifically, the FCH follows the preambles in the DL subframe. Thus, each DL subframe starts with a preamble followed by a Frame Control Header (FCH), the DL-MAP, and a UL-MAP, respectively. The FCH contains a DL Frame Prefix (DLFP) mapped to the FCH that is a data structure that contains information regarding the current frame.

Thus, the FCH contains information to specify location and the length of the DL-MAP that immediately follows the FCH; the modulation and coding scheme; the repetition coding rate; and the subchannel bitmap. Potentially, three FCHs may be located at three different subchannels depending on the segment number. FIG. 3 depicted the segment numbers as SEGMENT 0, SEGMENT 1, and SEGMENT 2. The segment number information may be found by locating the preamble subcarrier-sets that are used by the preamble. Again, the FCH contains information that allows the DL-MAP to be located, and therefore, if a terminal cannot decode the FCH then the DL-MAP of the frame cannot be located, and further, the terminal cannot access the frame. Hence, the terminal needs to correctly decode the FCH.

Figure 4:
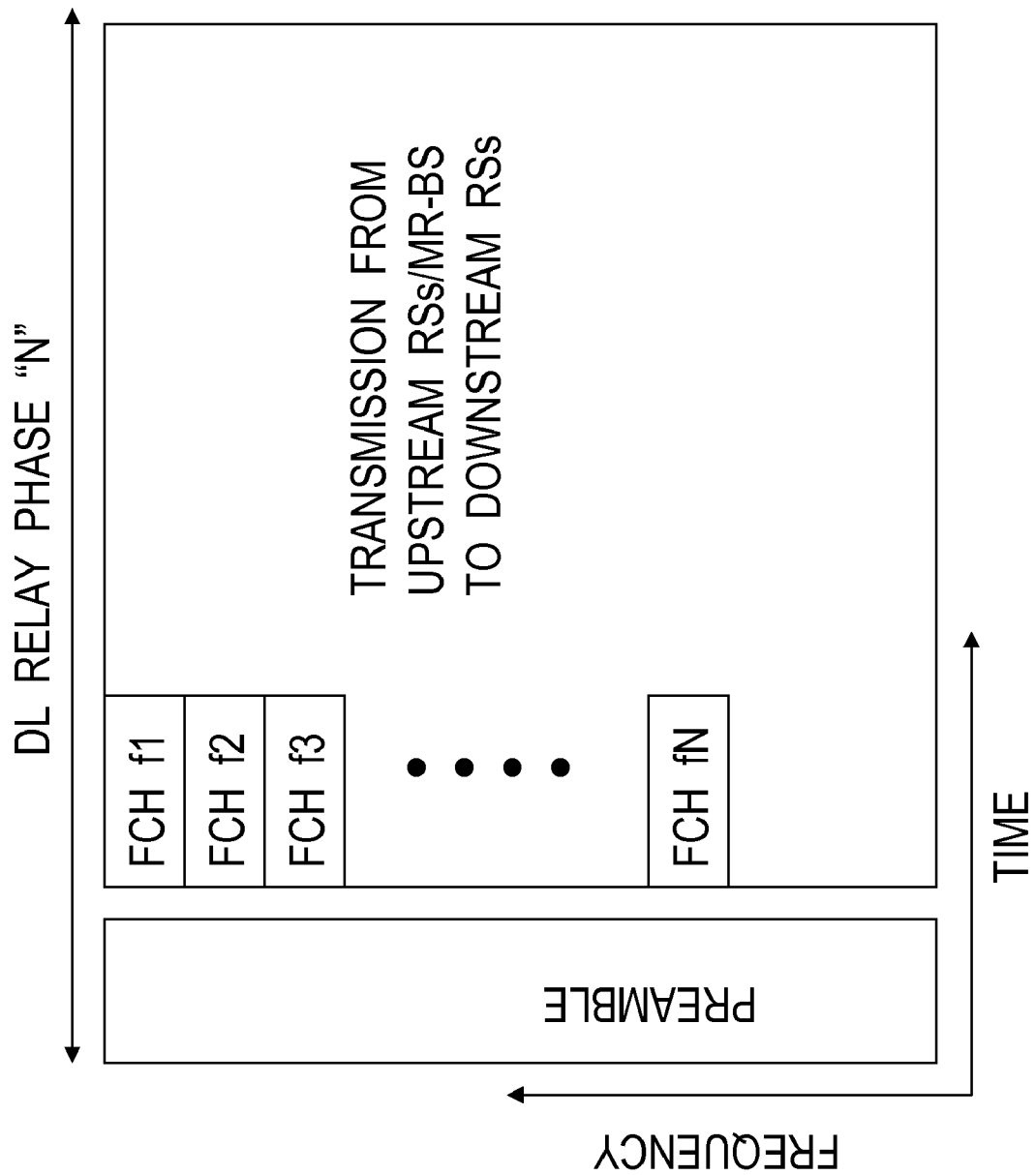
FIG. 4 shows the structure of a DL relay phase for a relay link in a multi-phase relay frame structure.

FIG. 4 shows the structure of a DL relay phase for a relay link in a multi-phase relay frame structure. For a dense cellular deployment, a relay phase may include more than 3 RSs scheduled to transmit an FCH to their downstream RSs. In order to accommodate the higher number of simultaneous DL transmitters on relay links, more than three FCH locations may be accommodated by mapping the FCH location to its preamble sequence set. The figure illustrates a DL relay phase having L distinct FCH locations to communicate transmissions from upstream RSs and MR-BSs to downstream RSs. If a preamble sequence set 0 is used, the FCH starts at subchannel f0; if a preamble sequence set 1 is used, the FCH starts at subchannel f1; if a preamble sequence set 2 is used, the FCH starts at subchannel f2; . . . and if a preamble sequence set L-1 is used, the FCH starts at subchannel fL-1.

In accordance with embodiments of the present invention, the number of FCH locations may be designed to match the number of preamble sequence sets. A record of the mapping between the FCH locations and preamble sequence sets is maintained and made available, possibly even specified in the standards document, for example. In accordance with one example embodiment, the system overhead of MR network 100 may be controlled by limiting the number (L) of distinct FCH locations and the number of preamble sequence sets, and set to a value of L=7. Note that for DL relay phases that have more than 7 DL transmitters, the RSs that are far away from each other may use the same FCH location since the interference may be low due to spatial separation. In this example where L=7, the interference on the FCH transmission may be reduced by a value of 1/L (1/7) compared to 1/3 on the access link.

In accordance with the present invention, a lower interference environment may be provided to transmit the FCH within each DL relay phase when the number of stations within the phase is less than L, where L is the number of distinct FCH locations. On the other hand, when there are more than L stations in a DL relay phase, a reduced interference environment for FCH transmission may be achieved by assigning the same FCH location to RSs that are far away from each other.

By now it should be apparent that in contrast to the prior art proposals in the IEEE 802.16 and 802.16e standards that mapped the FCH locations to the segment number and only allowed three segments, the present invention provides the mapping of FCH locations to preamble sequence sets. By mapping FCH locations to the preamble sequence sets, more than three stations may transmit their FCHs with minimized or reduced interference.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A wireless device to operate in a multi-hop network, comprising:
   a transceiver to receive a Frame Control Header (FCH); and
   a processor to maintain a record of a mapping between FCH locations and preamble sequence sets, where the FCH contains a DL Frame Prefix (DLFP) mapped to the FCH that is a data structure that contains information regarding the current frame and more than three FCHs are located at more than three different subchannels based on a segment number, and wherein a location of the received FCH is assigned to another wireless device in the multi-hop network wherein the wireless devices share the same FCH due to reduced interference provided by spatial separation between the wireless devices, the processor to set a limit to a number of distinct FCH locations and a number of preamble sequence sets, wherein the record shows the limit is exceeded and assigns the same FCH location to Relay Stations (RSs) that are far away from each other to take advantage of reduced interference from spatial separation.

2. The wireless device of claim 1 wherein the segment number information is found by locating preamble subcarrier-sets that are used by the preamble.

3. The wireless device of claim 1 wherein the processor decodes the FCH to find information that specifies location and a length of the DL-MAP that follows the FCH, a modulation and coding scheme, a repetition coding rate, and a subchannel bitmap.

4. A wireless device to operate in a multi-hop network, comprising:
a transceiver to receive a Frame Control Header (FCH); and
a processor to maintain a record of a mapping between FCH locations and preamble sequence sets and set a limit to a number of distinct FCH locations and a number of preamble sequence sets, and wherein the record shows the limit is exceeded and assigns the same FCH location to Relay Stations (RSs) that are far away from each other to take advantage of reduced interference from spatial separation.

5. The wireless device of claim 4 wherein the record of mapping shows more than three FCHs are located at different subchannels based on a segment number.

6. A wireless device to operate in a multi-hop network, comprising:
a transceiver to receive a Frame Control Header (FCH) in a frame comprising a downlink (DL) subframe, a DL preamble and point to multipoint (PMP) links, wherein each PMP link relies on a plurality of stations in the multi-hop network to maintain time and frequency synchronization that is performed via the broadcast and reception of the DL preamble, and wherein UL synchronization is performed by the plurality of stations using a ranging process; and
a processor to map FCH locations to preamble sequence sets rather than to a segment number to allow more than three stations in the plurality of stations to transmit their FCHs, and wherein more than one wireless device is assigned to the same FCH location through spatial reuse of the multi-hop network, the processor to set a limit to a number of distinct FCH locations and a number of preamble sequence sets, wherein the record shows the limit is exceeded and assigns the same FCH location to Relay Stations (RSs) that are far away from each other to take advantage of reduced interference from spatial separation.

7. The wireless device of claim 6 wherein mapping FCH locations to the preamble sequence sets, more than three stations transmit their FCHs with minimized or reduced interference.

8. The wireless device of claim 6 wherein a number of FCH locations matches a number of preamble sequence sets.

9. The wireless device of claim 6 wherein a record of mapping between the FCH locations and the preamble sequence sets is maintained and made available to other wireless devices.

10. A Relay Station (RS) in a macro cell of a multi-hop network wherein the RS is configured to work with a Multi-hop Relay Base Station (MR-BS) to provide multi-hop network coverage, wherein the multi-hop network utilizes a frame structure which allows multiple relay links to share a channel and multiple Point-to-Multipoint (PMP) links to be supported on the same channel and the frame structure includes a mapping of FCH locations to preamble sequence sets rather than to a segment number to allow more than three RSs to transmit their FCHs, and wherein more than one wireless device is assigned to the same FCH location through spatial reuse of the multi-hop network wherein the wireless devices share the same FCH made possible through reduced interference provided by spatial separation between the wireless devices, wherein a limit to a number of distinct FCH locations and a number of preamble sequence sets is set, wherein a record shows the limit is exceeded and assigns the same FCH location to Relay Stations (RSs) that are far away from each other to take advantage of reduced interference from spatial separation.

11. The RS of claim 10 wherein the mapping of the FCH locations to the preamble sequence sets allows more than three RSs to transmit their FCHs with minimized or reduced interference.

12. The RS of claim 10 wherein a number of FCH locations matches a number of preamble sequence sets.

13. The RS of claim 10 wherein a record of mapping between the FCH locations and the preamble sequence sets is maintained and made available to other wireless devices in the multi-hop network.

14. The RS of claim 10 wherein a limit is set to a number of distinct FCH locations and a number of preamble sequence sets in the multi-hop network.

* * * * *